Figure 4:
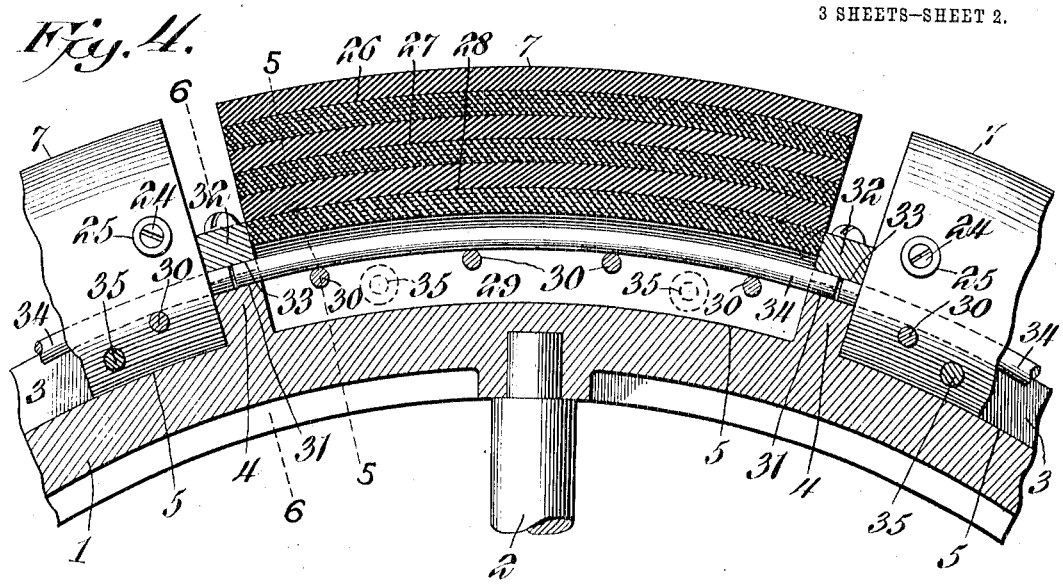

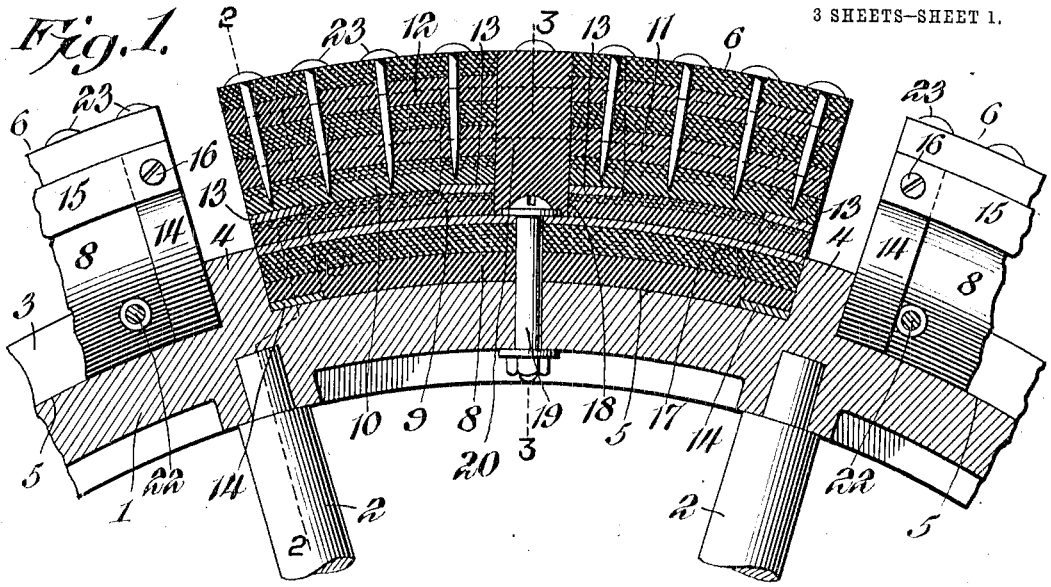
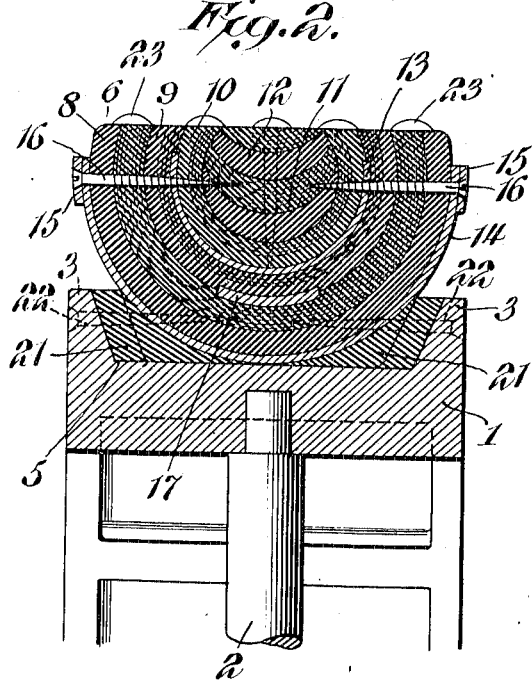
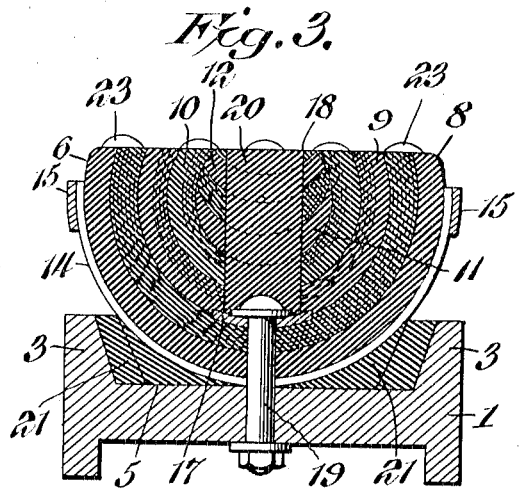

G. KELLY.
VEHICLE TIRE.
APPLICATION FILED JUNE 25, 1912.

1,096,842.

Patented May 19, 1914.

3 SHEETS—SHEET 2.

WITNESSES
Howard D. Orr.
F. T. Chapman.

George Kelly, INVENTOR,
BY C. G. Siggers
ATTORNEY

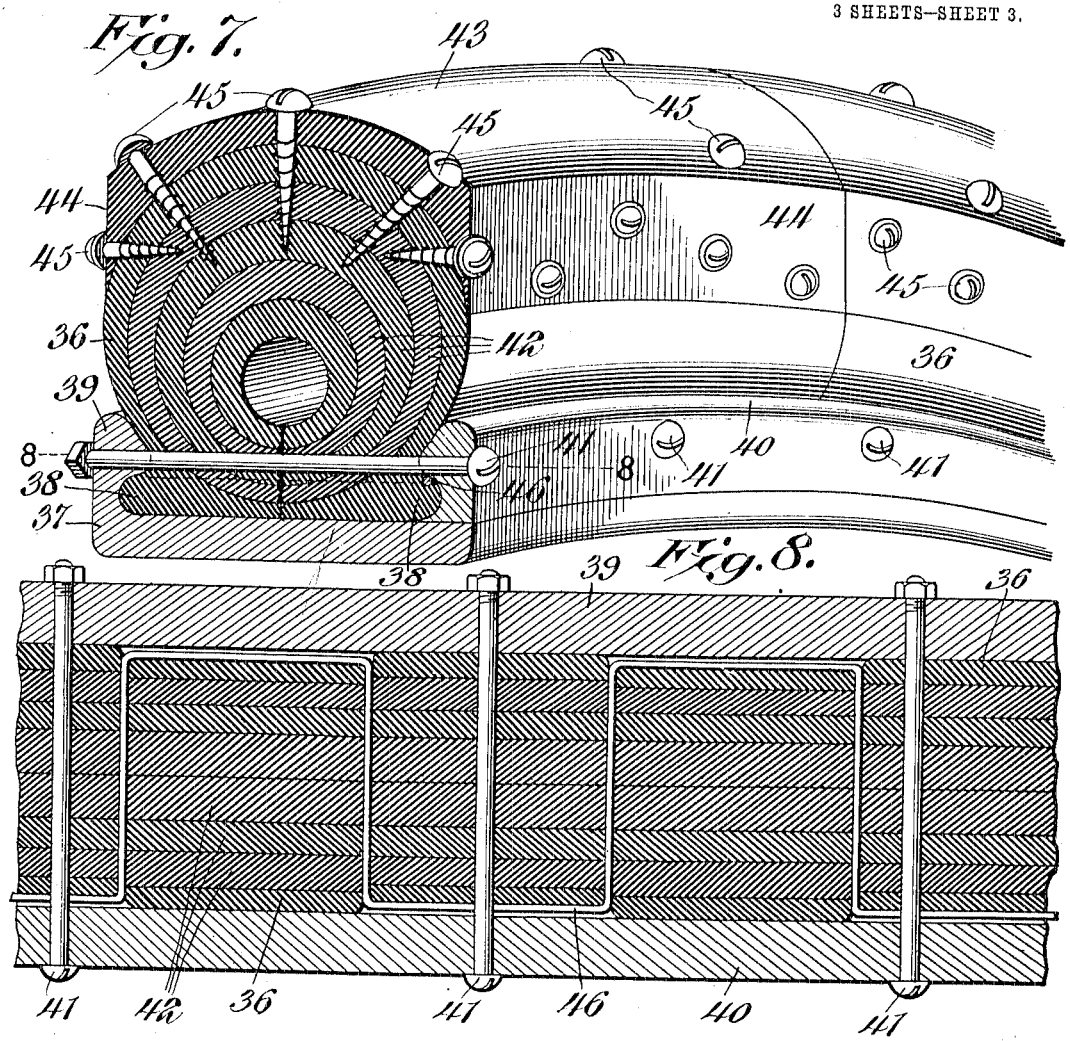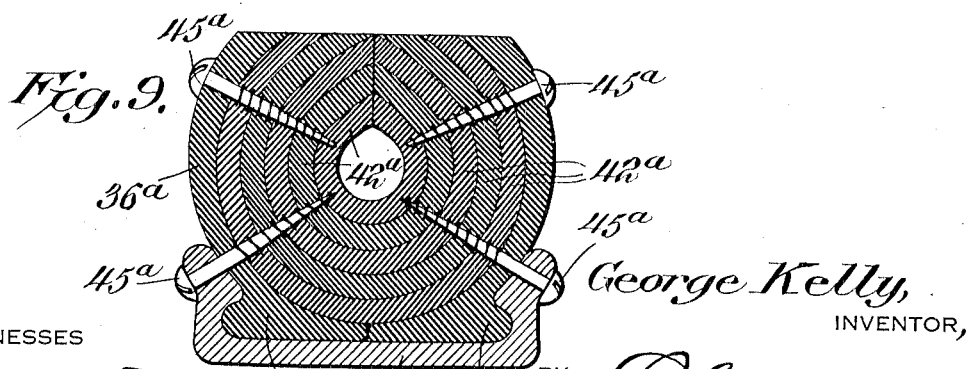

UNITED STATES PATENT OFFICE.

GEORGE KELLY, OF HINSDALE, ILLINOIS.

VEHICLE-TIRE.

1,096,842.  Specification of Letters Patent.  Patented May 19, 1914.

Application filed June 25, 1912. Serial No. 705,833.

*To all whom it may concern:*

Be it known that I, GEORGE KELLY, a citizen of the United States, residing at Hinsdale, in the county of Dupage and State of Illinois, have invented a new and useful Vehicle-Tire, of which the following is a specification.

This invention has reference to improvements in vehicle tires, and is designed more particularly for the production of automobile tires, although the invention may be successfully used in connection with auto-trucks.

The object of the invention is to utilize discarded or worn out pneumatic-tire casings, fire or steam hose, and the like, for the production of tires having the elasticity of solid rubber tires or cushion tires at but a small fraction of the cost of production of such tires, and at the same time having long life.

The life of the outer casing of a pneumatic tire is quite limited and oftentimes tire casings are rendered useless by accident or wear affecting but a portion of the tire casing, while other portions are serviceable, but repairs are too costly and consequently the casing is discarded. Such casings, and casings or hose which have been discarded for any cause, are useful in connection with the production of the present tire, which may be practically continuous throughout the circumference of the wheel, or may be made in short sections or blocks, in which latter case repairs are greatly facilitated.

In carrying out the present invention the discarded casings are cut into appropriate lengths, and then nested and secured together to form an approximately solid tire, or one with an inclosed air pocket, in which latter case the tire is in the nature of a cushion tire.

In accordance with the present invention the tire casings may be so nested as to present the tread portion of the outer one of the nested tires to the ground, or the nested sections of the tire may be reversed so that the adjoining edges are presented to the ground, and the sections may be provided with suitable means, such as nails or screws, so arranged as to present the heads to the ground, in which case the tire becomes anti-skidding.

The invention will be best understood from a consideration of the following detailed description, taken in connection with the accompanying drawings forming a part of this specification, with the further understanding that while the showings of the drawings illustrate practical forms of the invention it may assume other forms wherein the salient features of the invention are retained, wherefore the invention is not confined to any strict conformity with the showing of the drawings.

Figure 5:
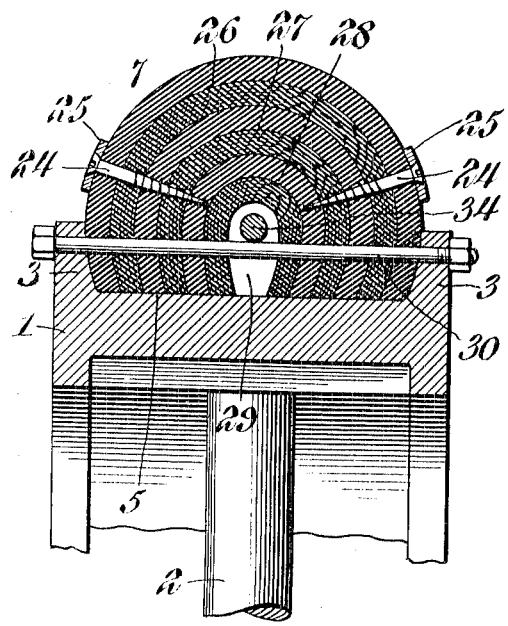
Figure 6:
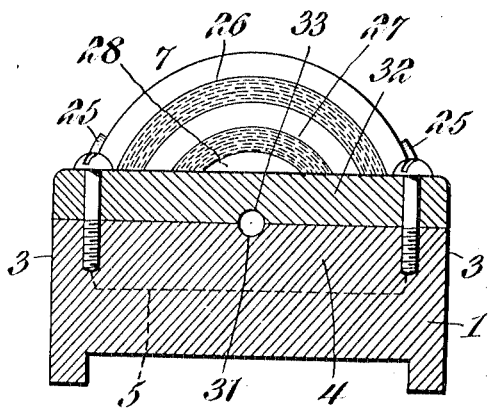

In the drawings:—Figure 1 is a longitudinal radial section of a portion of a wheel rim with a sectional tire therein, one member being shown in longitudinal radial section. Fig. 2 is a section on the line 2—2 of Fig. 1. Fig. 3 is a section on the line 3—3 of Fig. 1. Fig. 4 is a view similar to Fig 1, but showing a different embodiment of the invention. Fig. 5 is a section on the line 5—5 of Fig. 4. Fig. 6 is a section on the line 6—6 of Fig. 4. Fig. 7 is a view partly in perspective and partly in section of a tire made in accordance with the present invention, wherein an outer casing, complete so far as its cross-sectional contour is concerned, is employed. Fig. 8 is a section on the line 8—8 of Fig. 7. Fig. 9 is a cross-section of a tire similar in some respects to that shown in Fig. 7, but otherwise similar to Figs. 1, 2, and 3.

Referring to the drawings, there is shown a wheel rim 1 carried by spokes 2. This wheel rim is indicated as provided with side flanges 3 and cross ribs 4 spaced apart in the particular showing of Fig. 1 distances about the same as the spacing of the spokes. With respect to the rim it will be understood that the showing of the drawings is to a large extent typical, and while the structure shown is practicable, the invention is not confined to the particular form of wheel rim shown, but other forms of wheel rim may be employed. Nor is it necessary in carrying out the present invention to limit the distances between the ribs 4 to that indicated, for in some forms of the invention, especially where the tire is not of the sectional block form, the ribs 4 may be spaced apart greater distances or entirely omitted.

The tire between the ribs 4 is formed into seats or pockets 5 each designed to receive a block 6, Figs. 1, 2 and 3, or a block 7, Figs. 4, 5 and 6, these blocks being shown as conforming in shape longitudinally to the curvature of the wheel rim, and spaced apart at the ends distances equal to the spaces occupied by the ribs 4. When the ribs are spaced longer distances apart the blocks 6 or 7 are correspondingly lengthened.

The number of blocks 6 or 7 which may be used depends upon the lengths of such blocks, so that if a block be long enough a single one may be sufficient to constitute the tire, the ends being brought into close relation.

It is usually preferable to make the blocks 6 or 7 of comparatively short length, thus permitting the utilization of tire casings to a greater extent than in the longer lengths and greatly facilitating the making of repairs for the single short blocks are much more readily removed and replaced than is the case with longer blocks.

Tire casings are customarily made up of a number of adjacent layers of fabric impregnated with rubber, and exterior to the fabric is a covering of rubber. In the case of old tires the outer rubber casing may be materially worn, but usually some parts are not so badly worn as others, and in the form of the tire shown in Figs. 4, 5 and 6 the least worn portions may be utilized for the tread part of the improved tire.

In the form shown in Figs. 1, 2 and 3 the cut-off edges of the casings are utilized, and as these parts usually receive little or no wear they are practically the same as in a new tire.

In Figs. 1, 2 and 3 the tire is of this last-named type where the opposite edges of the tire casing are utilized for the tread portion of the new tire and several tire casings indicated at 8, 9, 10, 11 and 12 are nested together, being cut to appropriate length and width for the purpose, the original cross-sectional curvature of the casings, which may be of different sizes, facilitating the assembling. The nested casings constituting a tire section are so cut that the tread portion of the tire section is in substantially chord relation to the cross-sectional curvature of the tire section. Wherever desired elastic strips 13, 14 of metal are applied to the tire, some being embedded between intermediate layers, and others being exterior, as indicated, and these exterior strips may be joined by longitudinal strips 15 through which latter and through the strips 14 where coincident therewith screws 16 are passed and are embedded in the assembled casings, so as to unite them, wherefore the section 6 tends to hold its shape in action.

It is customary to introduce a longitudinal strip 17, and at an appropriate point in the block 6 a cavity 18 is provided for the passage of a bolt 19, which bolt may pass through a hole in the strip 17 and through the rim 1 of the wheel, so as to secure the block firmly in place, the strip 17, which is of metal, contributing to this result. After the bolt 19 is seated, the cavity 18 may be closed by a filler 20, which may be formed of a portion of a casing cemented in place.

The cavity or seat 5 in the rim designed to receive the corresponding block 6 is provided with filling-in pieces 21, which may likewise be made of discarded tire casings, and the tire block 6 readily seats against the filling-in pieces 21, while distortion of the parts under the stresses of travel is prevented by the metallic strips, although the assembled casings themselves resist to a large extent distorting forces. The block 6 is further held in place by screws 22 or other suitable fastening devices extending through the flanges 3 of the wheel rim and entering the body of the block 6. The number of these screws is determined by the sizes of the blocks 6 and the demand upon the tire.

The tread surface of each block 6 is appropriately protected against moisture by any suitable applied material, and is to an extent protected against wear by numerous nails 23 driven into the tire at the tread portion thereof, so that the heads of the nails are exposed. Of course, screws may replace nails and it will be understood that the term nails is used in a broad enough sense to cover any kind of studs on the tread surface of the tire, these studs not only preventing undue wear, but by their action upon the ground or other surface acting as anti-skidding devices and imparting a good grip to the tire upon the surface over which the tire travels.

In the particular structure shown in Figs. 1, 2 and 3 the end of each block 6 is spaced from the neighboring blocks by a distance equal to the thickness of the ribs 4, but it will be understood that the blocks may be brought closely together, or even in abutment, and the invention is not, therefore, confined in this respect to the exact arrangement shown. However, the individualizing and spacing of the blocks is advantageous in facilitating repairs and replacement.

In the structure shown in Figs. 4, 5 and 6 the arrangement of the tire casings when nested is the reverse of that of Figs. 1, 2 and 3 and the normal curved surface of the casing section of largest diameter is utilized as the tread surface. The casings are so cut that the parts will nest tightly within an outer section and may be united by screws 24 extending through washers 25, or any other suitable manner.

In the particular showing of Figs. 4, 5 and 6 three casing sections 26, 27 and 28 are indicated. Such an arrangement makes a very serviceable tire of from three and one-half to four inches in diameter with an inner cavity 29 as long as the block 7. The edge portions of the nested casings are lodged within the seat 5 of the rim and traversing the nested casings are an appropriate number of rods or bolts 30 which may be headed at the ends or otherwise appropriately formed to bind the casings together within the seat 5. Each rib 4 has at its center a channel 31 extending circumferentially and each rib 4 receives a cap block 32 also provided with a channel 33 matching the channel 31. These channels together form receptacles for the ends of rods 34 which may be curved substantially concentric with the axis of rotation of the wheel and are lodged within the cavity 29 in overlying relation to the rods or bolts 30, so as to effectually hold the tire block 7 in place. Screws 35 extending through the flanges 3 of the rim aid in holding the blocks 7 to their seats 5.

The form of tire shown in Figs. 4, 5 and 6 is somewhat more elastic than that of the form shown in Figs. 1, 2 and 3, but is lacking in the broad tread. However, it has its advantages for certain types of vehicles over and above the form of Figs. 1, 2 and 3.

Figs. 7, 8 and 9 show a form of tire where discarded outer casings are utilized in their entirety so far as their cross sectional extent is concerned, and such outer casing, indicated at 36 in Fig. 7, may be utilized in comparatively long or comparatively short circumferential sections. In Fig. 7 two such sections are indicated as mounted upon a rim 37 shaped to receive the beads 38 which practically all outer casings have. The rim 37 is shown as provided with flanges 39, 40 shaped to receive and lock the beads to the rim, and for facility of attachment and removal of the completed tire the flange 40 may be made removable in any suitable manner. In the particular instance shown the flange 40 is held to the main body of the rim by bolts 41, which may be made to traverse the portion of the tire immediately between the flanges, thus not only holding the tire firmly in place, but because of the sectional character of the tire preventing it from being dislodged from the rim or those portions of the felly of the tire adjacent the rim from creeping. The outer casing 36 is shown as inclosing a suitable number of layers 42 representing portions of discarded tire casings or steam hose or fire hose, or any material of like nature which can be utilized for the purpose. The tire in the particular form shown in Fig. 7 is further provided with a tread portion 43 so cut as to have flattened side portions 44 with a crown portion of a less degree of curvature than the casing 36 at its crown or tread portion, whereby the entire tire approaches a square form which is found to be advantageous for auto-trucks and the like.

The tread portion 43 is held to the main portion of the tire by screws 45 or other suitable fastening means which may enter the main body of the tire to an appropriate extent. These screws or other fastening devices where they are exterior to the ground engaging portion of the tread member 43 serve also as anti-skidding means.

It is advisable to secure the bead portion of the tire together in a more or less permanent manner before the tire is placed on the rim, and for this purpose a strong strand 46 is passed back and forth through the bead portion of the tire and intervening portions of the felly, as indicated in Figs. 7 and 8. The strand 46 may be a wire or a flexible bundle of small wires whereby the parts of the tire are in a manner sewed together.

In Fig. 9 the outer casing with the beads thereon is still employed, but the tread portion of the casing is removed and the remainder is indicated in Fig. 9 at 36ª, thereby presenting to the crown or tread portion of the tire the cut edges, as in Figs. 2 and 3, and this outer casing 36ª is provided with a filling made up of sections 42ª of discarded tire casings, hose or the like, so assembled as to present the cut edges to the tread portion of the tire, and the parts of the tire may be secured together and to the rim indicated at 37ª by screws 45ª or other fastening means. It will be understood that the tread portion of the tire shown in Fig. 9 may be finished as described with reference to Figs. 2 and 3 or any other suitable manner.

What is claimed is:—

1. A vehicle tire composed of a substantially concentrically arranged series of interlocked nested outer casings of pneumatic tires with each inner member tightly seated in the next outer one, and fastening devices traversing adjacent casings from the sides of the tire toward the center thereof.

2. A vehicle tire composed of a substantially concentrically arranged series of interlocked nested outer casings of pneumatic tires with each inner member tightly seated in the next outer one, the nested series having elastic metal bands embedded therein, and fastening devices traversing adjacent casings from the sides of the tire toward the center thereof.

3. In a vehicle tire, a plurality of members each of incomplete tubular form in cross-section and with the inner part made up of fabric layers and the outer part of rubber vulcanized to the fabric layers, the several members being of progressively smaller diameter from the outside of the tire inwardly and nested together.

4. A vehicle tire composed of interlocked nested sections of pneumatic tire casings in approximately concentric relation one to the other and said tire being cut off in substantially chord relation to the cross-sectional curvature of the sides of the tire.

5. A vehicle tire composed of interlocked nested sections each of incomplete tubular form and composed of inner layers of fabric and an outer layer of rubber vulcanized together, the tire having the nested sections cut at the tread portion in chord relation to the cross-sectional curvature of the sides of the tire to present edges at the tread part of the tire made up of the alternate layers of fabric and rubber composing the sections.

6. A vehicle tire composed of interlocked nested sections of pneumatic tire casings in approximately concentric relation one to the other and cut in approximately chord relation to the cross-sectional curvature of the sides of the tire to provide alternate exposed edges of grouped fabric layers and rubber at the tread, and fastening means traversing adjacent casings from the exterior to the interior of the tire.

7. A vehicle tire composed of a series of partly tubular members in interlocked concentric nested relation with curved metallic strips embedded therein at intervals in concentric relation to the members, the nested series being cut in substantially chord relation to the cross-sectional curvature of the sides of the tire to present opposite edges at the tread portion of the tire, and laterally directed fastening means extending from the exterior portions of the sides of the tire toward the central portion thereof.

In testimony, that I claim the foregoing as my own, I have hereto affixed my signature in the presence of two witnesses.

GEORGE KELLY.

Witnesses:
 FRED. B. SCHUCHARDT,
 A. H. WASEM.